United States Patent
Yoon et al.

[11] Patent Number: 5,966,987
[45] Date of Patent: Oct. 19, 1999

[54] CONTROLLING DEVICE OF TUNABLE FILTER

[75] Inventors: Yeung-lyul Yoon, Suwon; Tae-san Jung; Young-jin Song, both of Yongin, all of Rep. of Korea

[73] Assignee: Samsung Electronics Co., Ltd., Kyungki-do, Rep. of Korea

[21] Appl. No.: 09/047,383

[22] Filed: Mar. 25, 1998

[30] Foreign Application Priority Data

May 28, 1997 [KR] Rep. of Korea ...................... 97-21337
Jun. 20, 1997 [KR] Rep. of Korea ...................... 97-26103

[51] Int. Cl.⁶ .................................................. F16H 25/20
[52] U.S. Cl. .............................. 74/89.15; 74/104; 74/509; 250/226; 359/889
[58] Field of Search .................... 74/89.15, 104, 74/509; 250/226; 359/889

[56] References Cited

U.S. PATENT DOCUMENTS

| | | | |
|---|---|---|---|
| 2,338,271 | 1/1944 | Ulanet ................................. | 74/89.15 X |
| 3,402,613 | 9/1968 | Neusel et al. ......................... | 74/89.15 |
| 3,874,245 | 4/1975 | Krai et al. ............................. | 74/89.15 |
| 4,825,714 | 5/1989 | Yamanaka et al. .................... | 74/89.15 |
| 5,327,062 | 7/1994 | Byers ................................... | 74/89.15 X |
| 5,506,920 | 4/1996 | Suemura et al. ....................... | 385/25 |
| 5,646,399 | 7/1997 | Fukushima et al. ................... | 280/226 |

FOREIGN PATENT DOCUMENTS

| | | |
|---|---|---|
| 6-281813 | 10/1974 | Japan . |
| 61-271521 | 12/1986 | Japan . |
| 62-120423 | 7/1987 | Japan . |
| 63-147135 | 6/1988 | Japan . |
| 2-120716 | 5/1990 | Japan . |

*Primary Examiner*—Allan D. Herrmann
*Attorney, Agent, or Firm*—Burns, Doane, Swecker & Mathis, LLP

[57] ABSTRACT

A controlling device of a tunable filter includes a base, a tunable filter on the base along an optical path between first and second optical fibers, a holder rotatably installed on the base to support the tunable filter, a driving unit installed on the base for providing a rotational force, a speed reducing device, and a rotating unit for rotating the holder in accordance with the linear movement of the movable member. The speed reducing device has a worm gear extending from a rotating shaft of the driving unit, and a movable member provided with a threaded hole engaged with the worm gear to allow reciprocal movement along the worm gear according to the rotation direction of the worm gear.

4 Claims, 4 Drawing Sheets

CONTROLLING DEVICE OF TUNABLE FILTER

BACKGROUND OF THE INVENTION

1. Field of the Invention

The present invention relates to a controlling device of a tunable filter which selectively transmits rays of a predetermined wavelength of an incident light, and more particularly, to a controlling device for controlling the angle that the incident rays make with the line normal to the surface of the tunable filter.

2. Description of the Related Art

Generally, a tunable filter including a line filter is used to select a ray of a specific wavelength in an optical communication system employing a wavelength division multiplexer (WDM), an erbium doped fiber amplifier (EDFA) or the like.

Referring to FIG. 1, a conventional controlling device of a tunable filter comprises a holder 8 in which a tunable filter 5 is installed, a DC servo-motor 11 for driving the tunable filter 5, an encoder 13 fixed to a rotating shaft 11a of the DC servo-motor 11, and reduction gears 15 for changing the rotational speed of the servo-motor 11 to a suitable speed. The encoder 13 measures the angle of disposition of the tunable filter 5 with respect to the incident rays by detecting the rotation angle of the DC servo-motor 11.

The DC servo-motor 11 controls the angle of disposition of the tunable filter 5 with respect to the incident rays. The tunable filter 5 selectively transmits a ray of a specific wavelength among the rays emitted from a first optical fiber 1 and directs the selected rays to a second optical fiber 9.

The reduction gears 15 installed between the DC servo-motor 11 and the tunable filter 5 include a center gear 17 fixed to the rotating shaft 11a of the DC servo-motor 11, first, second and third gears 18a, 18b and 18c meshed with the center gear 17, a ring gear 19 having teeth 19a on the inner circumferential surface thereof to mesh with the first, second and third gears 18a, 18b and 18c. A rotating shaft 19c provided at the center of a cover 19b of the ring gear 19 is fitted to the holder 8. In order to drive the tunable filter 5 in fine movements, a plurality of the reduction gears 15 as described above are provided.

As the center gear 17 is rotated according to the rotation of the DC servo-motor 11, the first, second and third gears 18a, 18b and 18c meshed with the center gear 17 are simultaneously rotated. Since the first, second and third gears 18a, 18b and 18c are meshed with the ring gear 19, they revolve around the center gear 17. The ring gear 19 is rotated at a speed that is equivalent to the revolution speed of the first, second and third gears 18a, 18b and 18c.

Accordingly, the ring gear 19 is rotated at a speed slower than that of the DC servo-motor 11, and at the same time the holder 8 fitted to the rotating shaft 19c of the ring gear 19 is rotated at the same slower speed, and therefore the angle of disposition of the tunable filter 5 can be finely controlled. Consequently, since the angle at which the tunable filter 5 is disposed can be appropriately controlled according to the value measured in the encoder 13, a ray of specific wavelength can be selectively transmitted.

However, since the controlling device of the tunable filter is provided with a plurality of reduction gears, the structure of the control device is complicated and the size of the whole controlling device is large.

SUMMARY OF THE INVENTION

To solve the above problems, it is an objective of the present invention to provide a controlling device of a tunable filter for finely controlling the angle of disposition of the tunable filter, which has a relatively simple construction and is compact.

Accordingly, to achieve the above objective, there is provided a controlling device of a tunable filter comprising: a base; a tunable filter disposed on the base along an optical path between first and second optical fibers; a holder rotatably installed on the base to support the tunable filter; a driving unit installed on the base for providing a rotational force; a speed reducing device having a worm gear extending from a rotating shaft of the driving unit and a movable member provided with a threaded hole engaged with the worm gear to allow reciprocal movement along the worm gear according to the rotation direction of the worm gear; and a rotating unit for rotating the holder in accordance with the linear movement of the movable member.

Here the rotating unit comprises a lever having one end fixed to the holder and the other end contacting the movable member and pivoting around the one end in accordance with the linear movement of the movable member, and an elastic biasing unit elastically biasing the lever toward the movable member to keep the lever in contact with the movable member.

Further, the elastic biasing unit comprises a supporting member, one end of which contacts with the lever, a bracket provided on the base to slidingly support the supporting member, and a spring for pressing the supporting member of the lever to contact the movable member.

According to one aspect of the present invention, the rotating unit comprises a connecting bar extending from one side of the movable member and having a connecting pin, and a connecting piece extending from one side of the holder and having a longitudinal slot for the connecting pin to be slidingly assembled therein.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
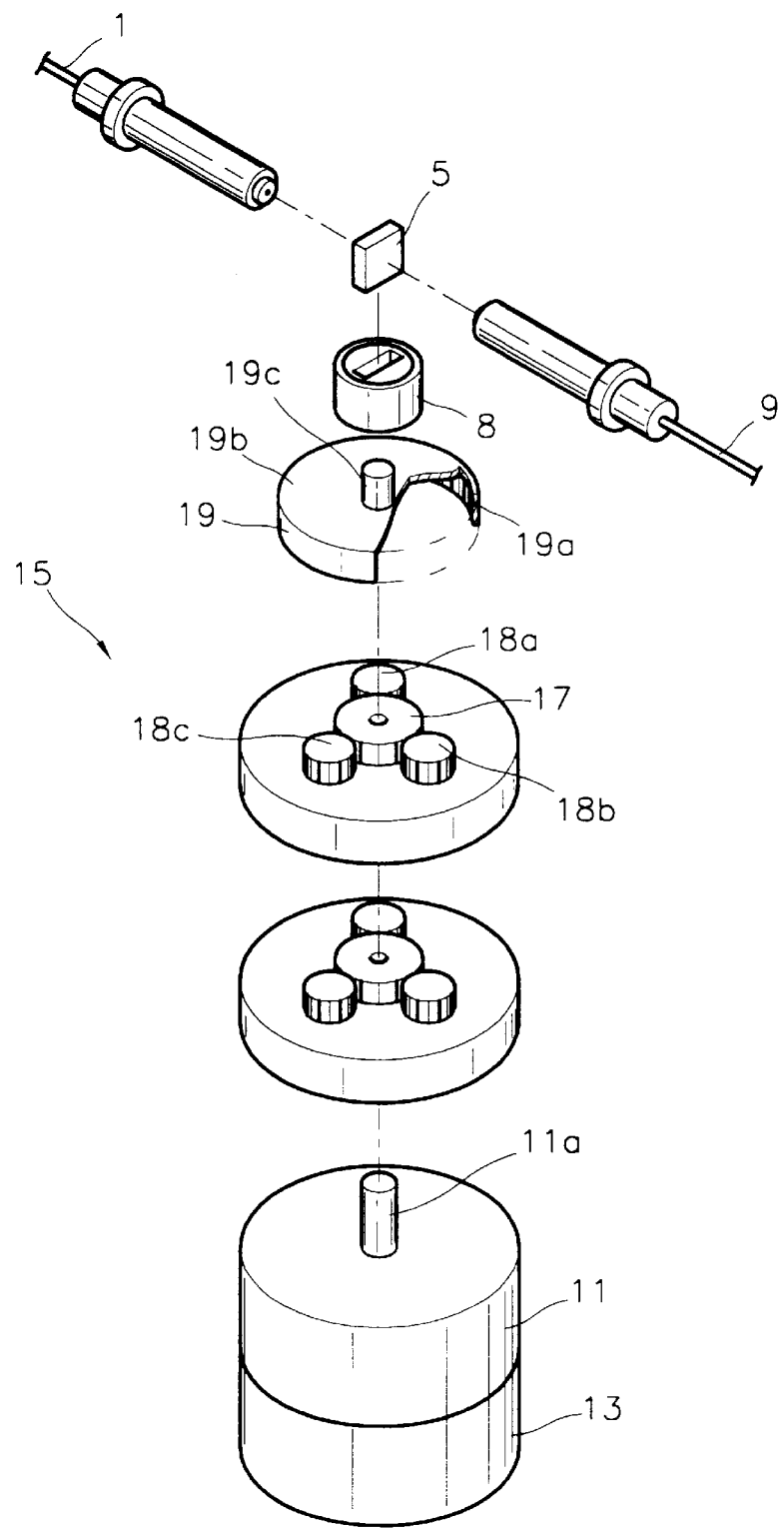
FIG. 1 is an exploded perspective view schematically illustrating a conventional controlling device of a tunable filter.
Figure 2:
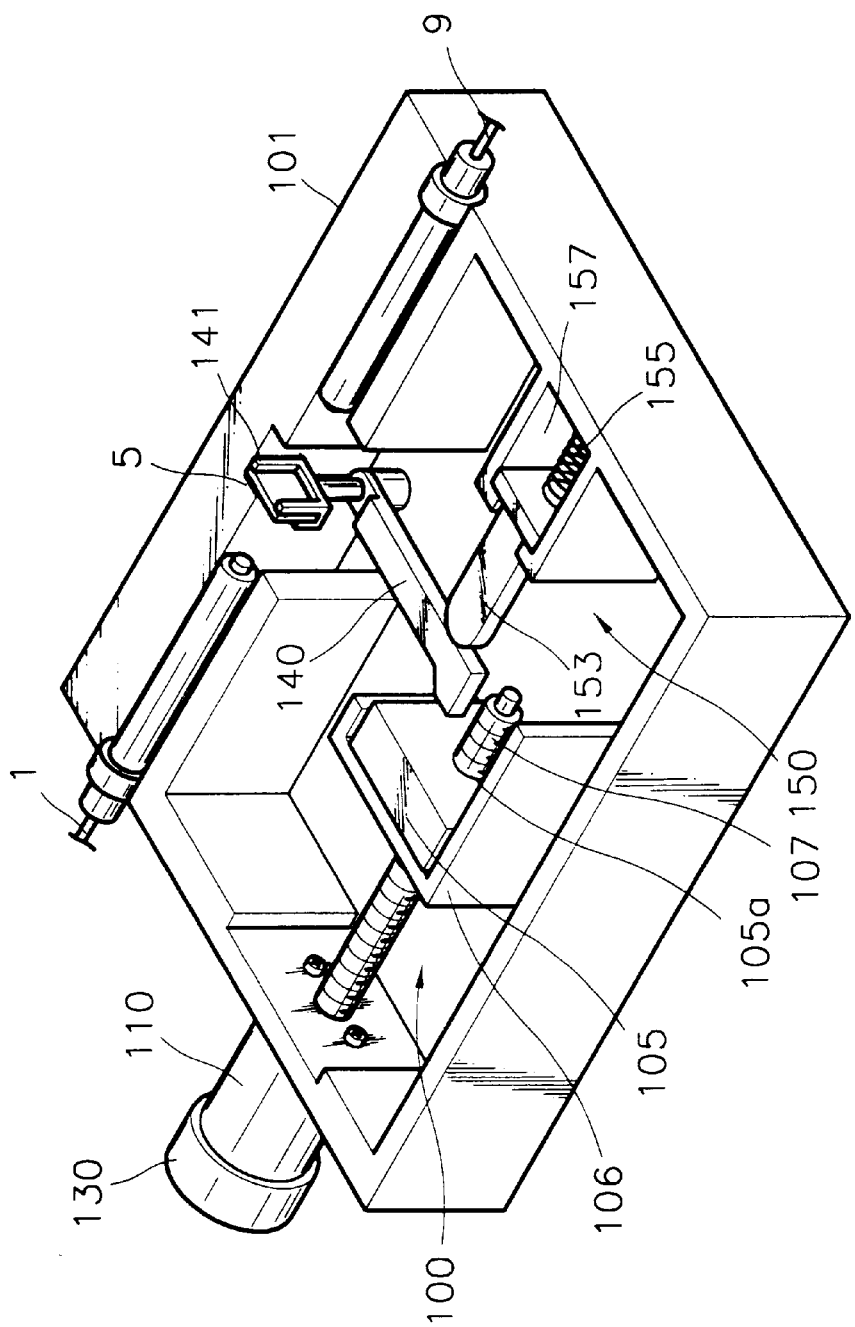
FIG. 2 is a perspective view schematically illustrating an embodiment of a controlling device of a tunable filter according to the present invention.
Figure 3:
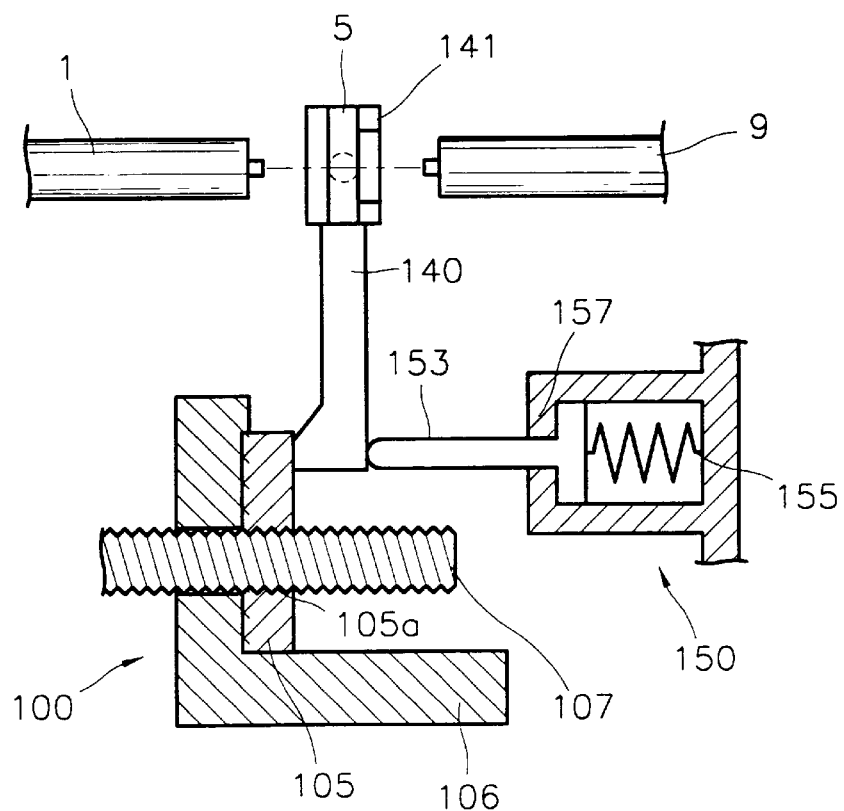
FIGS. 3 and 4 are partial cross-sectional views schematically illustrating the operation of the controlling device of the tunable filter of FIG. 2.

As shown in FIGS. 2 and 3, an embodiment of a controlling device of a tunable filter according to the present invention includes a base 101, a driving unit 110 installed on the base 101 for providing a rotational force. Also, an encoder 130 for measuring the rotation angle of the driving unit 110, and a speed reducing device 100 for transferring power from the driving unit 110 ultimately to a holder 141 with a predetermined reduction ratio are installed on the base.

The driving unit 110 is provided with a motor, for example, a DC servo-motor. The encoder 130 is fixed to a shaft (not shown) of the driving unit 110 to measure the rotation angle of the driving unit 110.

The speed reducing device 100 includes a worm gear 107 extending from the rotational shaft of the driving unit 110, and a movable member 105 provided with a threaded hole 105a engaged with the worm gear 107 and functions to transform the rotational movement of the driving unit 110 into a linear movement. Accordingly, the movable member 105 moves back and forth along a guide member 106 as the worm gear 107 rotates. Here when the pitch of the thread of the worm gear 107 and threaded hole 105a is made finer, it is possible to change the rapid rotational movement of the driving unit 110 into a slower linear movement of the movable member 105.

Meanwhile, a tunable filter 5 as supported by the holder 141 is disposed between first and second optical fibers 1 and 9 which are installed on the base 101. The holder 141 is fixed to one end of a lever 140 the other end of the lever 140 moves in accordance with the movement of the movable member 105. In other words, as the movable member 105 moves, the lever 140 pivots around the one end of the lever 140 and consequently the holder 141 rotates as well.

The lever 140 is biased toward the movable member 105 by an elastic biasing unit 150 to keep the lever 140 in contact with the movable member 105. The elastic biasing unit 150 comprises a supporting member 153 for supporting the lever 140, a spring 155 elastically biasing the supporting member 153 toward the lever 140, and a bracket 157 provided on the base 101 to slidingly support the supporting member 153.

The lever 140 and the elastic biasing unit 150 acts to rotate the holder 141 in accordance with the linear movement of the movable member 105.

Figure 4:
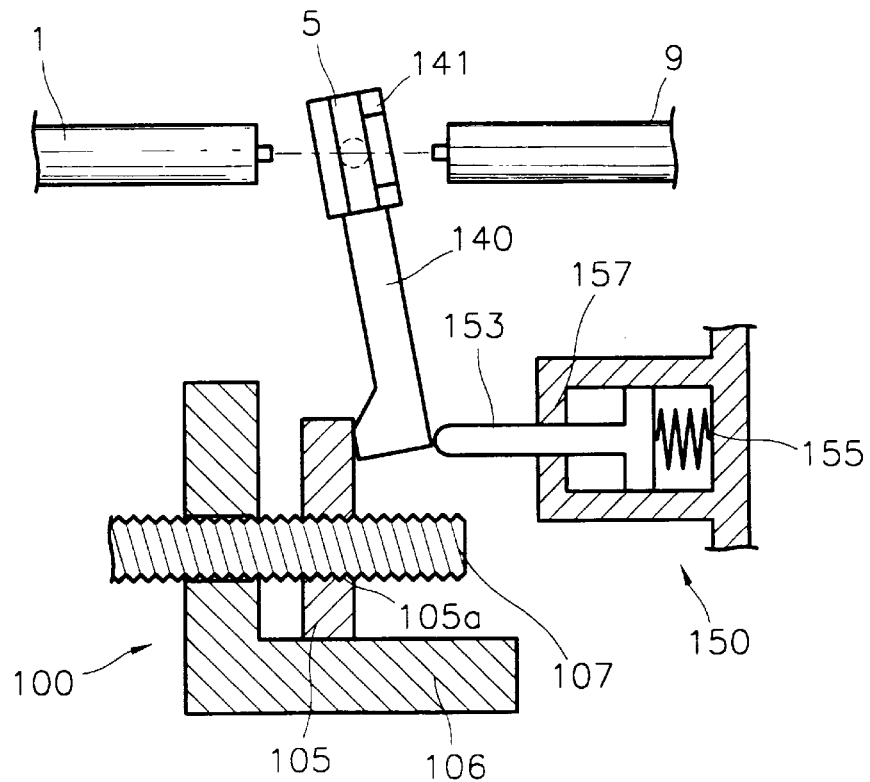

In the operation of the present embodiment, as the worm gear 107 is rotated by the driving unit 110, the movable member 105 engaged with the worm gear 107 is moved forward along the guide member 106 as shown in FIG. 4. At the same time, the lever 140 which is in contact with the movable member 105 pivots to rotate the holder 141, and accordingly, it is possible to control the angle of disposition of the tunable filter 5 with respect to the incident rays by rotating the tunable filter 5 supported by the holder 141. Here, since the rotational movement of the driving unit 110 is changed into a slow linear movement of the movable member 105, the tilt angle of the tunable filter 5 can be finely controlled.

When the worm gear 107 is rotated in the opposite direction, the movable member 105 is moved backward and accordingly, the lever 140 is pivoted in the opposite direction by the elastic biasing unit 150. Consequently, to control the angle of disposition of the tunable filter 5 with respect to the incident rays by appropriately rotating the worm gear allows the tunable filter 5 to selectively transmit a ray of a specific wavelength among the rays emitted from a first optical fiber 1 and to direct the selected rays to a second optical fiber 9.

Another embodiment of a controlling device of tunable filter according to the present invention is described with reference to FIG. 5. Here, reference numerals that are the same as those shown in FIG. 2 denote similar members having the functions.

Figure 5:
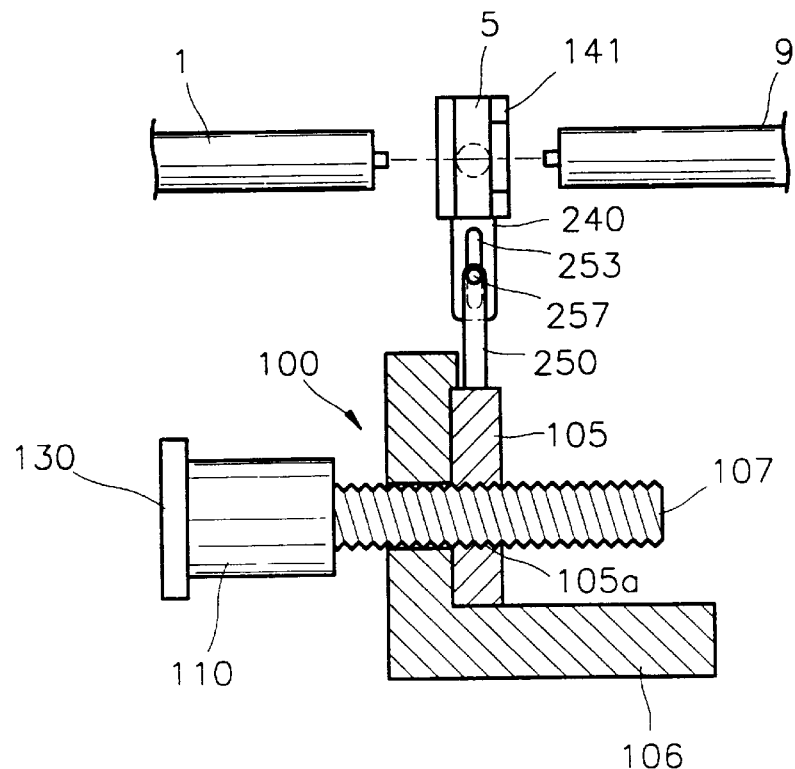
FIG. 5 is a partial cross-sectional view schematically illustrating another embodiment of a controlling device of a tunable filter according to the present invention.

Referring to FIG. 5, a connecting bar 250 provided with a connecting pin 257 extends from one side of a movable member 105. A connecting piece 240 extends from one side of the holder 141 supporting a tunable filter 5 and has a longitudinal slot 253 for the connecting pin 257 of the movable member 105 to be slidingly assembled therein.

The connecting piece 240 and the connecting bar 250 act to rotate the holder 141 in accordance with the linear movement of the movable member 105.

Figure 6:
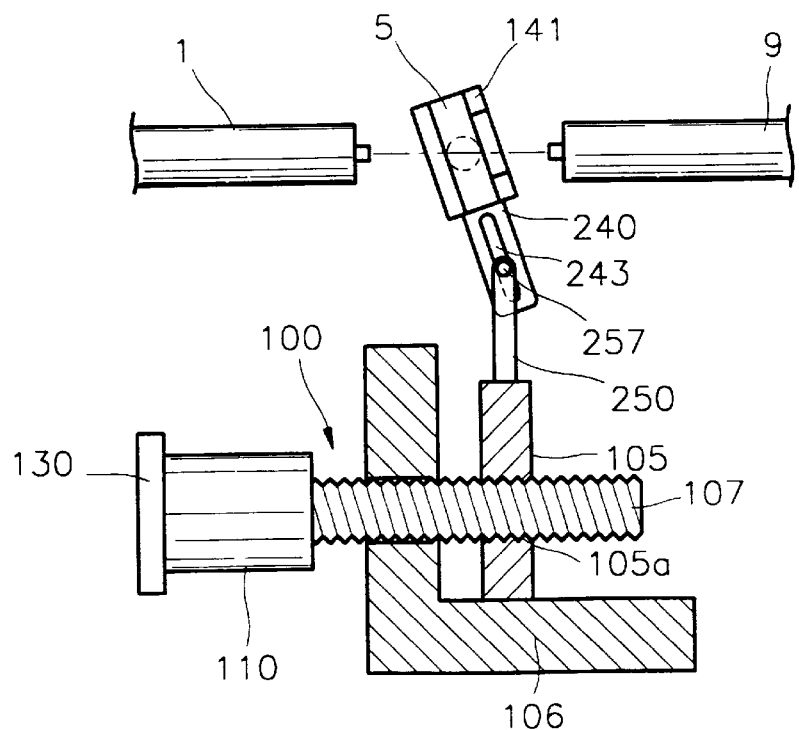
FIG. 6 is a partial cross-sectional view schematically illustrating the controlling device of the tunable filter of FIG. 5 being operated.

In the operation of the present embodiment, when a worm gear 107 is rotated by a driving unit 110, the movable member 105 engaged with the worm gear 107 is moved forward along a guide member 106 as shown in FIG. 6. At the same time, the connecting bar 250 of the movable member 105 is moved and accordingly the connecting pin 257 slides along the longitudinal slot 253 of the connecting piece 240. Consequently, the holder 141 is rotated to control the angle of the tunable filter 5 to the incident rays.

The controlling devices of the tunable filter according to the present invention as described above, can finely control the tunable filter by reducing the fast rotational movement of the driving unit to a slow movement of the holder by a simple speed reducing device comprised of a worm gear and a movable member. Therefore, the structure of the device is simple and the size of the device can be minimized.

What is claimed is:

1. A controlling device of a tunable filter comprising:

a base:

a tunable filter disposed on the base along an optical path between first and second optical fibers;

a holder rotatable installed on the base to support the tunable filter;

a driving unit installed on the base for providing a rotational force;

a speed reducing device having a worm gear extending from a rotating shaft of the driving unit and a movable member provided with a threaded hole engaged with the worm gear to allow reciprocal movement along the worm gear according to the rotation direction of the worm gear; and a rotating unit for rotating the holder in accordance with the linear movement of the movable member, the rotating unit comprising:

a lever having one end fixed to the holder and the other end contacting the movable member and pivoting around the one end in accordance with the linear movement of the movable member; and an elastic biasing unit elastically biasing the lever toward the movable member to keep the lever in contact with the movable member, the elastic biasing unit comprising:

a supporting member in which one end thereof contacts the lever;

a bracket provided on the base to slidingly support the supporting member; and a spring for elastically pressing the supporting member of the lever to contact the movable member.

2. The controlling device of a tunable filter as claimed in claim 1, further comprising a guide member for guiding the linear movement of the movable member.

3. The controlling device of a tunable filter as claimed in claim 1, wherein the rotating unit comprises:

a connecting bar extending from one side of the movable member and having a connecting pin; and a connecting piece extending from one side of the holder and having a longitudinal slot for the connecting pin to be slidingly assembled therein.

4. The controlling device of a tunable filter as claimed in claim 3, further comprising a guide member for guiding the linear movement of the movable member.

* * * * *